United States Patent [19]

Buss

[11] 4,256,426

[45] Mar. 17, 1981

[54] TRACTOR FRONT MOUNTED ROUND BALE CARRIER

[76] Inventor: Merle D. Buss, Box 36, R.R. 1, Fortuna, Mo. 65034

[21] Appl. No.: 39,666

[22] Filed: May 16, 1979

[51] Int. Cl.³ .............................................. B60P 1/34
[52] U.S. Cl. .................................. 414/24.5; 172/273; 172/810; 280/760; 414/595; 414/696; 414/920
[58] Field of Search ............... 414/24.5, 24.6, 471, 414/595, 634, 635, 681, 663, 684, 685, 686, 696, 721, 722, 728, 742, 743, 911, 920; 280/760; 187/9 R, 10; 37/118 R, 118 A; 172/272–276, 801, 809

[56] References Cited

U.S. PATENT DOCUMENTS

| | | | |
|---|---|---|---|
| 510,628 | 12/1893 | Burton | 414/696 |
| 1,514,818 | 11/1924 | Anthony | 37/118 A X |
| 1,581,153 | 4/1926 | Anthony et al. | 37/118 A X |
| 2,389,044 | 11/1945 | Grubich | 414/696 X |
| 2,955,844 | 10/1960 | Wills | 280/760 |
| 3,067,966 | 12/1962 | Hicks | 414/728 X |
| 4,023,690 | 5/1977 | Goode | 414/24.5 |
| 4,120,405 | 10/1978 | Jones et al. | 414/24.5 |

*Primary Examiner*—Leslie J. Paperner
*Attorney, Agent, or Firm*—Harvey B. Jacobson

[57] ABSTRACT

A frame for attachment to the forward end of a farm tractor and defining upstanding guide structure thereon including a substantially vertical lower portion and an upwardly and rearwardly inclined upper portion. A follower is supported from the guide structure for movement up and down the latter and includes a forwardly projecting horizontal spear assembly for spearing the center of a round bale of hay lying upon the ground toward which the associated tractor is advanced. A hydraulic cylinder is operatively connected between the frame and the follower for moving the latter upwardly and downwardly along the guide structure.

12 Claims, 7 Drawing Figures

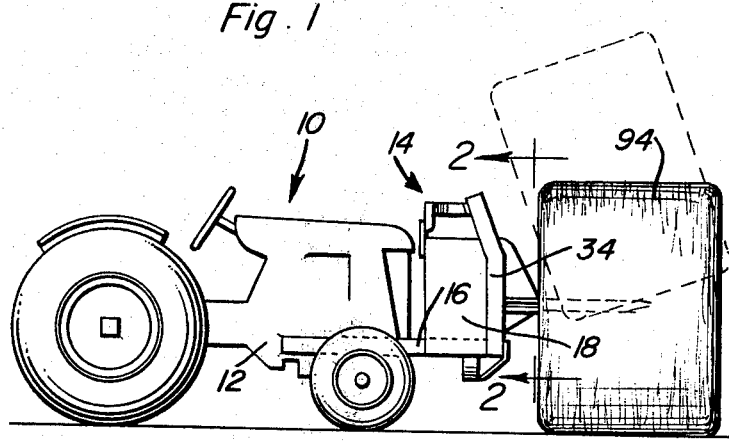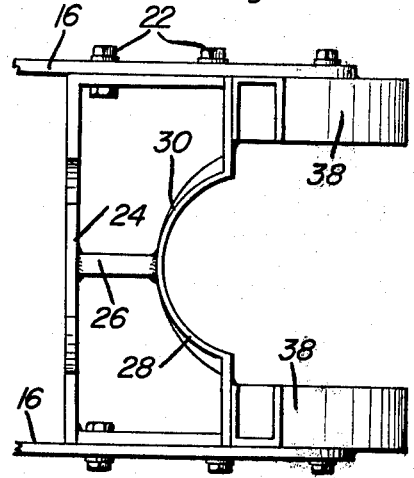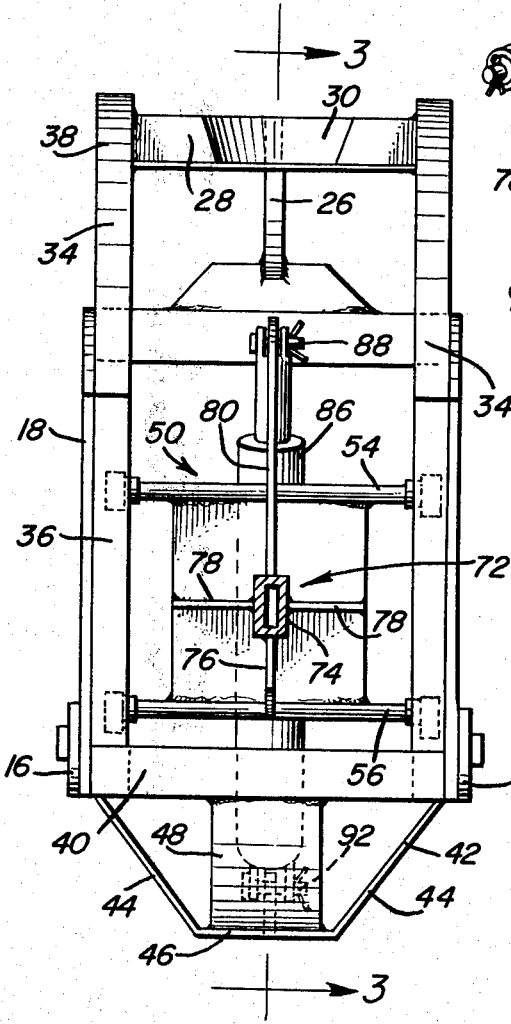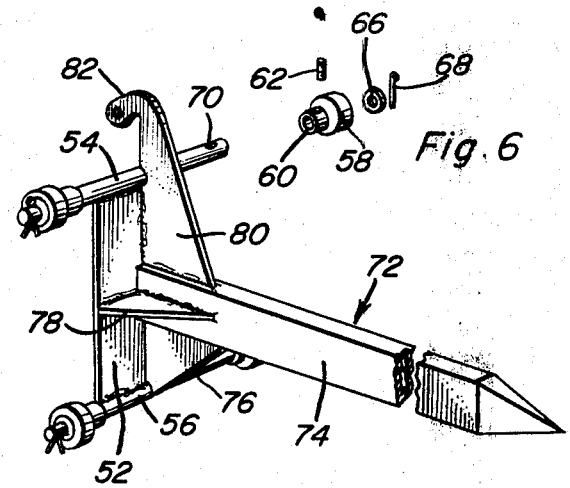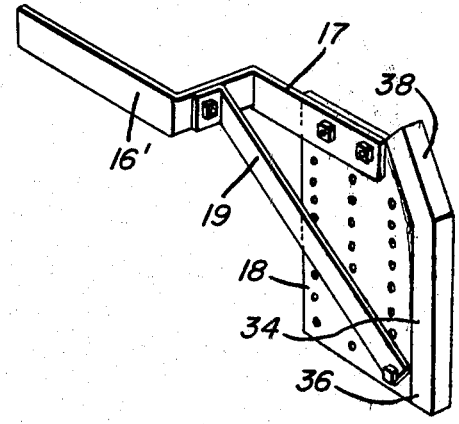

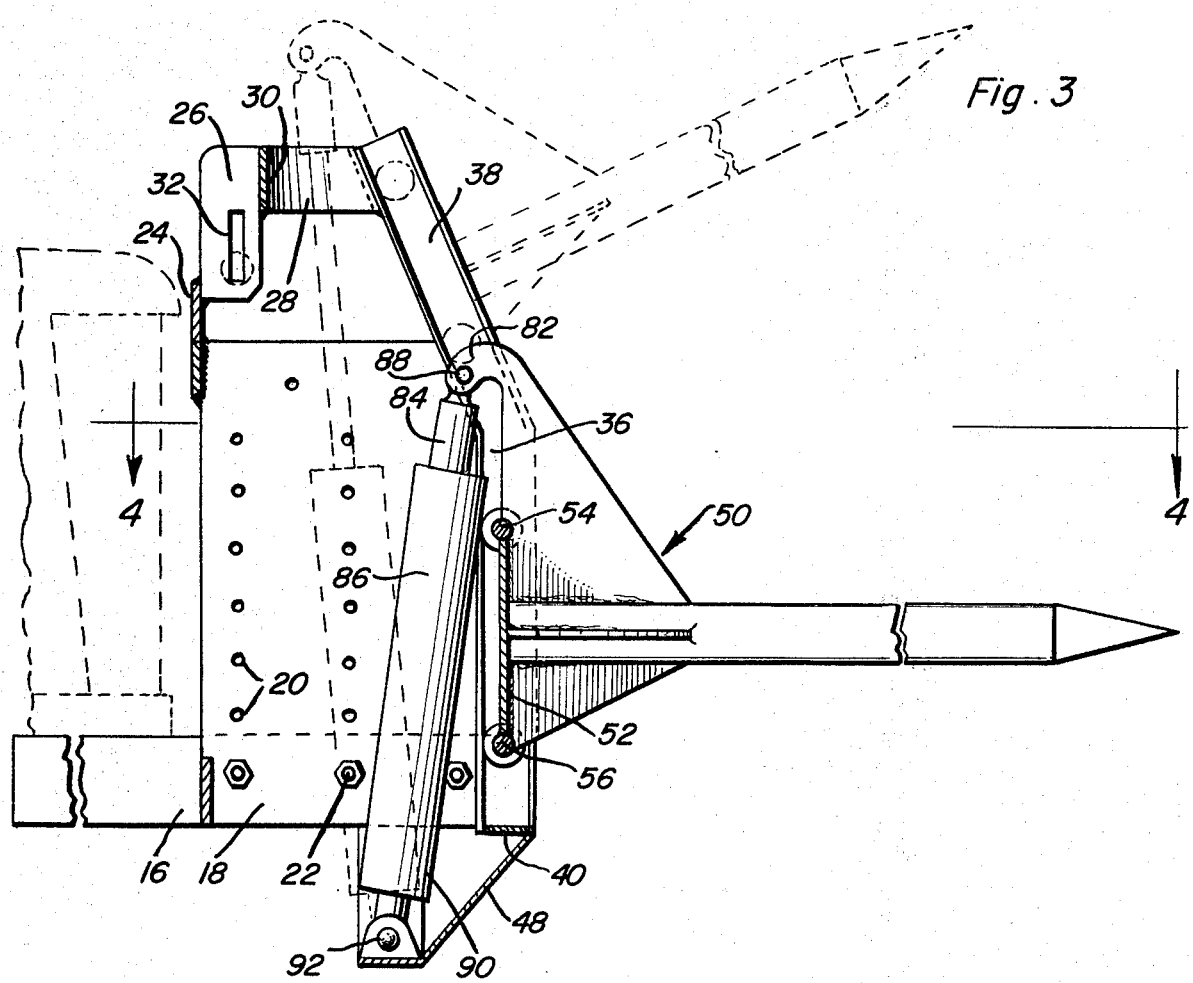
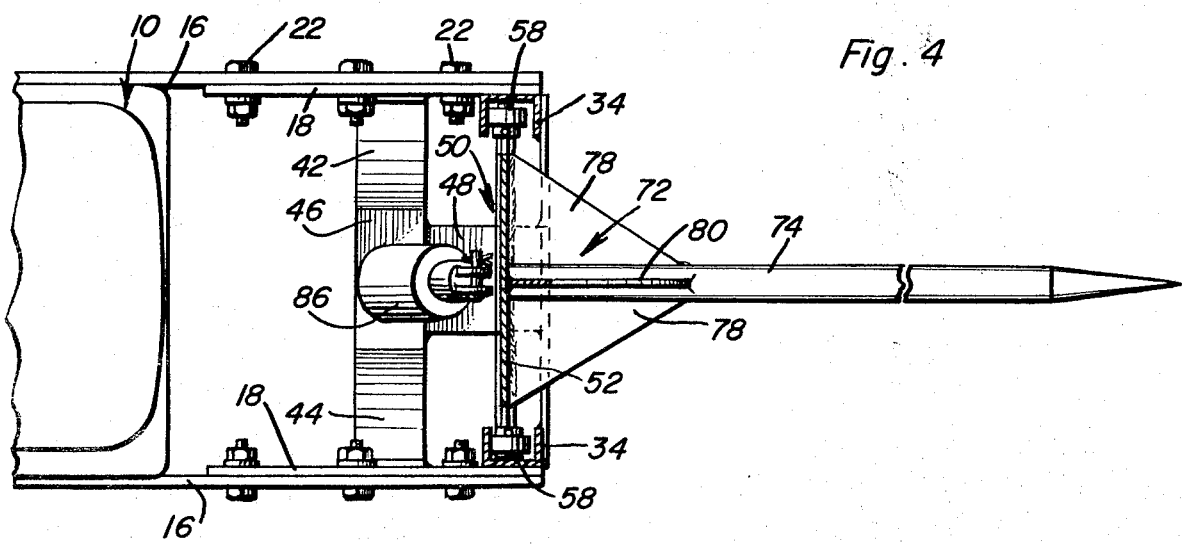

TRACTOR FRONT MOUNTED ROUND BALE CARRIER

BACKGROUND OF THE INVENTION

To assist in handling transporting large round bales of hay tractor front mounted and vertically shiftable spear assemblies have heretofore been provided. Examples of previously known formed of front tractor mounted spear assemblies and similar structures are disclosed in U.S. Pat. Nos. 3,921,837, 4,073,532, 4,090,616, 4,099,629 and 4,120,405.

However, most of the front tractor mounted round bale spear assemblies known heretofore require the utilization of a tractor equipped with bucket or other implement lift arms. Accordingly, these bale handling structures are not readily adaptable to farm tractors which do not include bucket or other accessory lift arms. Therefore, a need exists for a round bale spearing and handling attachment for the forward end of a conventional farm tractor not equipped with bucket or other accessory lift arms.

BRIEF DESCRIPTION OF THE INVENTION

The carrier of the instant invention includes a frame which may be semi-permanently attached to the foreward end of a standard farm tractor and which defines an upstanding guide assembly. A follower is provided for movement along the guide assembly and the guide assembly includes a vertical lower portion and a rearwardly and upwardly inclined upper portion. The follower assembly includes a forwardly projecting horizontal spear assembly and a hydraulic cylinder is operatively connected between the frame and the follower assembly. In this manner the farm tractor may be advanced toward a cylindrical hay bale lying upon the ground and the height of the spear assembly may be adjusted in order to spear the center of the round or cylindrical bale. Thereafter, the hydraulic cylinder may be operated to raise the follower and thus the spear assembly and bale supported therefrom. During initial raising of the follower assembly, the speared bale is lifted vertically, but during the latter part of the raising of the follower assembly, the round bale is tilted rearwardly in order to insure that it is maintained in secure position upon the spear assembly.

The main object of this invention is to provide a tractor front mounted round bale handler and carrier which may be utilized on conventional farm tractors for the purpose of lifting and transporting heavy round cylindrical bales of hay.

Another object of this invention is to provide a round or cylindrical bale carrier in accordance with the preceding objects and which may be actuated to initially lift the associated round bale in a vertical direction above the ground and which thereafter tilt the supported bale toward a rearwardly and upwardly inclined position.

A further important object of this invention is to provide a round bale carrier which may be readily mounted upon existing conventional farm tractors.

Another object of this invention is to provide a round bale carrier which may be readily utilized in conjunction with round bales of different sizes.

A final object of this invention to be specifically enumerated herein is to provide a round bale carrier in accordance with the preceding objects and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a side elevational view of a conventional form of farm tractor with the round bale carrier of the instant invention mounted on the forward end of the tractor and operatively associated with a round bale of hay to be lifted from the ground, a lifted position of the round bale being illustrated in phantom line;

FIG. 2 is an enlarged fragmentary transverse vertical sectional view taken substantially upon the plane indicated by the section line 2—2 of FIG. 1;

FIG. 3 is a fragmentary longitudinal vertical sectional view taken substantially upon the plane indicated by the section line 3—3 of FIG. 2;

FIG. 4 is a fragmentary horizontal sectional view taken substantially upon the plane indicated by the section line 4—4 of FIG. 3;

FIG. 5 is a top plan view of the frame portion of the round bale carrier;

FIG. 6 is a partially exploded perspective view of the follower and spear assembly of the round bale carrier; and FIG. 7 is a perspective view of a modified form of mount for the frame of the carrier adapting it for attachment to a different size tractor.

DETAILED DESCRIPTION OF THE INVENTION

Referring now more specifically to the drawings, the numeral 10 generally designates a conventional form of farm tractor including opposite side frame portions 12. The round bale carrier of the instant invention is referred to in general by the reference numeral 14 and includes a pair of elongated horizontal mounting bars 16 for securement in any conventional manner, such as by bolting, to the opposite side frame portions 12 of the tractor 10 with one pair of ends of the mounting bar 16 projecting forwardly of the front end of the tractor.

A pair of upstanding opposite side plates 18 are provided and include vertically spaced sets of transverse bores 20 formed therethrough and the plates 18 are secured to the forwardly projecting end portion of the bars 16 by means of suitable bolts 22 secured through selected sets of apertures or bores 20 and the forward ends of the mounting bars 16. An upper rear transverse plate 24 extends between and is secured to the upper rear corners of the plates 18 and a center upstanding support plate 26 is secured to and projects upwardly from the upper forward side of the transverse plate 24 centrally intermediate the plates 18. A forward transverse plate 28 including a central forwardly opening bowed portion 30 has its bowed portion 30 anchored relative to the upper portion of the front side of the support plate 26 in any convenient manner, such as by welding, and the lower portion of the support plate 26 includes a vertical slot 32 formed therein.

A pair of upstanding guide channels 34 are provided and secured at their lower ends to the forward lower corners of the plates 18 and at their upper ends to the opposit ends of the transverse plate 28. The guide channels 34 include vertical lower portions 36 and rearwardly and upwardly inclined upper portions 38. The channels 34 open toward each other and a forward transverse brace 40 extends between and is anchored relative to the lower ends of the channels 34. A generally U-shaped stirrup 42 including a pair of oppositely inclined and upwardly divergent arms 44 interconnected at their lower ends by means of a horizontal brace 46 is provided and the upper ends of the arms 44 are anchored relative to the lower ends of the plates 18 intermediate the front and rear edges thereof. Also, a forwardly and upwardly inclined brace 48 extends between the forward edge of the brace 46 and the central portion of the lower edge of the brace 40.

A follower assembly referred to in general by the reference numeral 50 is provided and includes an upstanding plate 52 from whose upper and lower edge portions a pair of horizontal transverse shafts 54 and 56 are supported. The shafts 54 and 56 include opposite end portions which project outwardly beyond the corresponding vertical side edges of the plate 52 and each of the shaft ends has a roller 58 journaled thereon by a bearing assembly secured in position on the corresponding shaft end by a set screw 62, a retaining washer 66 being disposed on each shaft end outwardly of the corresponding roller 58 and retained thereon by a cotter pin 68 secured through a diametric bore 70 formed in the corresponding shaft end.

A horizontally outwardly projecting spear assembly 72 is supported from the plate 52 and includes a spear member 74 braced relative to the plate 52 by gusset plate 76, 78 and 80, the gusset plate 80 comprising an upstanding plate projecting upwardly from the spear member 74 and terminating at its upper end in a transversely bored rearwardly curving hook portion 82.

The upper extendible end of the piston portion 84 of a hydraulic cylinder 86 is pivotally anchored relative to the hook portion 82 by a pivot pin 88 and the lower end of the cylinder portion 90 of the hydraulic cylinder 86 is pivotally anchored relative to the central portion of the brace 46 by a pivot fastener 92.

In operation, the frame comprising the components 18, 24, 26, 30, 34, 42 and 48 is mounted upon bars 16 in adjusted position by the fasteners 22 secured through a selected set of apertures or bores 20. Thereafter, the tractor 10 may be advanced toward a round or cylindrical bale 94 disposed on the ground and the height of the spear assembly 72 may be adjusted by extension or retraction of the hydraulic cylinder 86 in order that the spear assembly may be aligned with the center of the bale 94. Then, the tractor 10 may be driven forward in order to cause the spear assembly 72 to pierce the center of the round bale 94. Thereafter, the tractor 10 is stopped and the hydraulic cylinder is extended so as to raise the follower assembly 50 and thus the spear assembly 72 in a vertical direction whereby the round bale 94 will be lifted vertically from the ground. However, continued upward movement of the follower assembly 50 along the channel 74 will cause the follower assembly 50 to be tilted rearwardly and upwardly and thus the bale 94 to be similarly tilted. With the bale supported in a rearwardly and upwardly inclined position, it is securely mounted upon the spear assembly 72 and the tractor 10 may be driven to a location in which the bale 94 is to again be lowered onto the ground or onto a trailer for subsequent transport of the bale 94. Inasmuch as the bale 94 is tilted rearwardly and upwardly during transiet on the front of the tractor, the bale 94 is securely supported from the spear assembly 72 against accidental dislodgement therefrom, even when the tractor 10 is moving over rough ground.

With attention now invited more specifically to FIG. 7 of the drawings, there may be seen a modified form of mounting bar 16' including an outwardly offset forward end portion 17 and which may be utilized in mounting the frame from a different tractor. The bar 16' is used, together with a companion bar of mirror image in configuration, when mounting the frame on a larger tractor having a wider frame and having a frame spaced a greater distance above the ground. Of course, inasmuch as the plates 18 are to be mounted in generally the same height relative to the ground, the forward offset ends 17 of the mounting bars 16' may have the upper edge portions of the plates 18 supported therefrom. In this instance, forwardly and downwardly inclined brace members 19 may be secured between the mounting bars 16' and the lower forward corners of the plates 18.

If it is desired, the pin 88 may be removed and the upper end of the piston portion 84 may be reanchored to the plate 26 by use of the same pin. Then, the entire assembly 50 may be removed from the upper ends of the channels 34.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a farm vehicle including front and rear ends, an upright frame mounted on one of said ends and defining upstanding guide means, a follower supported from said guide means for guided up and down movement therealong, said follower including a horizontally outwardly projecting spear structure for spearing the central portion of a cylindrical hay bale toward which said one end of said vehicle is advanced, and thrust means connected between said follower and said frame for adjustably raising and lowering said follower along said guide means, said guide means including coacting portions for initial substantial vertical raising said follower and tilting and raising said follower along an inclined path upwardly inclined toward the other end of said vehicle during subsequent raising of said follower along said guide means, said thrust means comprising an elongated hydraulic cylinder having one end thereof pivotally connected to said frame and the other end thereof pivotally anchored relative to said follower, said other end of said cylinder being releasably pivotally connected to said follower and said frame including means defining an anchor point to which said other end of said cylinder may be releasably connected for storage purposes.

2. The combination of claim 1 wherein said guide means includes a pair of upstanding opposing channel members supported from said frame, the lower end portions of said channel members being substantially vertically disposed and the upper end portions of said channel members being upwardly inclined toward said other end of said vehicle.

3. The combination of claim 2 wherein said follower includes an upstanding member including upper and lower portions, upper and lower pairs of opposite side rollers journaled from said upper and lower portions on opposite sides of said upstanding member, said rollers being rollingly received within said channel members.

4. The combination of claim 3 wherein said spear structure projects horizontally outwardly and is supported from said upstanding member.

5. The combination of claim 4 wherein said upstanding member comprises a plate member, the upper and lower marginal edge portions of said plate member having axial shafts supported therefrom, said rollers being journaled from the opposite end portions of said axial shafts, and said spear structure being braced relative to said plate by gusset plates secured between said plate and said spear structure.

6. The combination of claim 1 wherein said guide means includes a pair of upstanding opposing channel members supported from said frame, the lower end portions of said channel members being substantially vertically disposed and the upper end portions of said channel members being upwardly inclined toward said other end of said vehicle, said follower including an upstanding member including upper and lower portions, upper and lower pairs of opposite side rollers journaled from said upper and lower portions on opposite sides of said upstanding member, said rollers being rollingly received within said channel member, the upper ends of said channel members being open and said rollers being displaceable outwardly from said channel members through the open upper ends thereof.

7. The combination of claim 6 wherein said spear structure projects horizontally outwardly and is supported from said upstanding member.

8. The combination of claim 7 wherein said upstanding member comprises a plate member, the upper and lower marginal edge portions of said plate member having axial shafts supported therefrom, said rollers being journaled from the opposite end portions of said axial shafts, and said spear structure being braced relative to said plate by gusset plates secured between said plate and said spear structure.

9. The combination of claim 1 wherein said vehicle includes opposite side frame portions adjacent said one end thereof, a pair of mounting bars secured along said opposite side frame members and projecting outwardly from said one end of said vehicle, said frame including upstanding opposite side plates having vertically spaced sets of mounting bores formed therethrough, said plates being secured to the forward ends of said mounting bars through the utilization of fasteners secured through corresponding sets of said bores and said mounting bars, whereby said plates may be supported from said bars in vertically adjusted positions relative thereto.

10. The combination of claim 9 including inclined brace means secured between said mounting bars at points spaced therealong inward from the outer ends thereof and portions of said plates vertically spaced relative to the outer ends of said mounting bars.

11. The combination of claim 1 wherein said one end of said vehicle comprises the front end thereof.

12. In combination with a farm vehicle including front and rear ends, an upright frame mounted on one of said ends and defining upstanding guide means, a follower supported from said guide means for guided up and down movement therealong, said follower including a horizontally outwardly projecting spear structure for spearing the central portion of a cylindrical hay bale toward which said one end of said vehicle is advanced, and thrust means connected between said follower and said frame for adjustably raising and lowering said follower along said guide means, said thrust means comprising an elongated hydraulic cylinder having one end thereof pivotally connected to said frame and the other end pivotally anchored relative to said follower, said other end of said cylinder being releasably pivotally connected to said follower and said frame including means defining an anchor point to which said other end of said cylinder may be releasably connected for storage purposes, said follower being upwardly disengageable from the upper ends of said channel members.

* * * * *